United States Patent
Matsuda et al.

(10) Patent No.: US 8,609,564 B2
(45) Date of Patent: Dec. 17, 2013

(54) MANUFACTURING METHOD FOR LAMINATED CERAMIC CAPACITOR, AND LAMINATED CERAMIC CAPACITOR

(75) Inventors: Makoto Matsuda, Nagaokakyo (JP); Tomoyuki Nakamura, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 0 days.

(21) Appl. No.: 13/403,019

(22) Filed: Feb. 23, 2012

(65) Prior Publication Data
US 2012/0147518 A1    Jun. 14, 2012

Related U.S. Application Data

(63) Continuation of application No. PCT/JP2010/062213, filed on Jul. 21, 2010.

(30) Foreign Application Priority Data

Aug. 27, 2009    (JP) .................. 2009-196346

(51) Int. Cl.
*C04B 35/468* (2006.01)
*H01G 4/06* (2006.01)

(52) U.S. Cl.
USPC ........................ 501/139; 501/138; 264/615

(58) Field of Classification Search
USPC .................. 501/138, 139; 264/615
See application file for complete search history.

(56) References Cited

U.S. PATENT DOCUMENTS

| | | | |
|---|---|---|---|
| 7,176,156 B2 * | 2/2007 | Umeda et al. ............ | 501/138 |
| 7,186,570 B2 | 3/2007 | Kijima et al. | |
| 7,652,870 B2 | 1/2010 | Yamazaki et al. | |
| 7,883,905 B2 | 2/2011 | Saita et al. | |
| 8,404,607 B2 * | 3/2013 | Fukuda et al. ............ | 501/138 |
| 2005/0107241 A1 * | 5/2005 | Umeda et al. ............ | 501/138 |
| 2009/0176345 A1 | 7/2009 | Saita et al. | |
| 2011/0216471 A1 * | 9/2011 | Fukuda et al. ............ | 361/321.4 |

FOREIGN PATENT DOCUMENTS

| | | |
|---|---|---|
| CN | 1510718 A | 7/2004 |
| CN | 101233590 A | 7/2008 |
| CN | 101346784 A | 1/2009 |
| JP | 11-163273 A | 6/1999 |
| JP | 2000-216042 A | 8/2000 |

(Continued)

OTHER PUBLICATIONS

PCT/JP2010/062213 Written Opinion dated Sep. 16, 2010.

(Continued)

*Primary Examiner* — Karl Group
(74) *Attorney, Agent, or Firm* — Dickstein Shapiro LLP

(57) ABSTRACT

A method for manufacturing a laminated ceramic capacitor by firing a laminated body which includes dielectric ceramic layers containing a dielectric ceramic raw material powder and internal electrodes. The firing is carried out in accordance with a temperature profile in which the average rate of temperature rise is 40° C./second or more from room temperature to a maximum temperature. The dielectric ceramic raw material powder contains a $BaTiO_3$ system as its main constituent, and contains R (R is Sc, etc.), M (M is Mn, etc.), and Mg as accessory constituents, in which, when the total amount of the accessory constituents contained is denoted by D parts by mol with respect to 100 parts by mol of the main constituent, an the specific surface area of the main constituent is denoted by E $m^2/g$, then D/E is 0.2 to 0.8.

5 Claims, 2 Drawing Sheets

(56) References Cited

FOREIGN PATENT DOCUMENTS

| | | |
|---|---|---|
| JP | 2007-063040 A | 3/2007 |
| JP | 2007-180316 A | 7/2007 |
| JP | 2008-226941 A | 9/2008 |
| KR | 10-2006-0135249 | 12/2006 |
| WO | WO-2007-013604 A1 | 2/2007 |

OTHER PUBLICATIONS

PCT/JP2010/062213 International Search Report dated Sep. 16, 2010.

* cited by examiner

US 8,609,564 B2

MANUFACTURING METHOD FOR LAMINATED CERAMIC CAPACITOR, AND LAMINATED CERAMIC CAPACITOR

CROSS REFERENCE TO RELATED APPLICATIONS

The present application is a continuation of International application No. PCT/JP2010/062213, filed Jul. 21, 2010, which claims priority to Japanese Patent Application No. 2009-196346, filed Aug. 27, 2009, the entire contents of each of which are incorporated herein by reference.

FIELD OF THE INVENTION

This invention relates to a method for manufacturing a laminated ceramic capacitor and the laminated ceramic capacitor, and more particularly, an improvement in a method for manufacturing a laminated ceramic capacitor, and an improvement in the composition of a $BaTiO_3$ based dielectric ceramic for use in a laminated ceramic capacitor which is suitable for the improved manufacturing method.

BACKGROUND OF THE INVENTION

In laminated ceramic capacitors, for the purpose of reduction in size (reduction in thickness), it is effective to attempt to reduce in thickness not only of dielectric ceramic layers, but also of internal electrodes. However, when the internal electrodes are further reduced in thickness, electrode disconnection is likely to be caused as a result of a firing step for sintering of a raw laminated body. For example, the following technique has been proposed as a technique which can prevent the electrode disconnection.

In Japanese Patent Laid-Open Publication No. 2008-226941 (Patent Document 1), the rate of temperature rise adjusted to 500° C./hour to 5000° C./hour in a firing step prevents electrode disconnection to achieve an electrode thickness of 0.8 to 1 μm.

In Japanese Patent Laid-Open Publication No. 2000-216042 (Patent Document 2), structural defects such as cracks are prevented to increase the reliability of a laminated ceramic capacitor obtained, in such a way that the rate of temperature rise is adjusted to 500° C./hour or more at 700° C. to 1100° C. in a temperature rising process for firing, the oxygen partial pressure in the atmosphere is adjusted to $10^{-8}$ atm or less at 1100° C. or more, and the oxygen partial pressure is adjusted to $10^{-8}$ atm or more partially at 1100° C. or less in a temperature falling process.

In Korean Patent Laid-Open Publication No. 10-2006-0135249 (Patent Document 3), the temperature is increased at a rate of temperature rise of 10° C./second up to a temperature 20° C. lower than the maximum temperature to achieve a balance between the prevention of electrode disconnection and the prevention of overshoot during the temperature rise (reaching a temperature higher than a desired firing temperature during the temperature rise).

While the prior art described in any of Patent Documents 1 to 3 achieves the effect of allowing the internal electrodes to be reduced in layer thickness by means such as increasing the rate of temperature rise, the effect has a limitation, and for example, in a laminated ceramic capacitor including internal electrodes containing Ni as a conductive component, it is extremely difficult to achieve 0.3 μm or less as an electrode thickness after firing.

In addition, the atmosphere for firing a raw laminated body including internal electrodes using a base metal as a conductive component is, for example, a $N_2/H_2/H_2O$ system which needs to be controlled on a more reducing side than a Ni/NiO equilibrium oxygen partial pressure, and this need will restrict the equipment and the material design.

In addition, when the ceramic contains, for example, a volatile component such as Li, this volatile component is likely to scatter during firing. Further, the residual volume of the volatile component is likely to vary depending on the size of the raw laminated body to be fired, that is, the chip size, and the amount of charging a firing furnace, and it is difficult to suppress the variation in this residual volume.

On the other hand, laminated ceramic capacitors have been progressively reduced in size (reduced in thickness), and the dielectric ceramic layers are becoming 0.5 μm or less in thickness. In order to respond to this reduction in thickness of the dielectric ceramic layers, there is a need for size reduction of the dielectric ceramic grains constituting the dielectric ceramic layers. Therefore, there is also a need for microscopic grains of a dielectric ceramic raw material powder.

However, when the dielectric ceramic raw material powder is reduced in size, for example, to several nm level, grain growth is likely to be developed during firing, and as a result, may lead to a problem that the laminated ceramic capacitor is inferior in terms of lifetime characteristics under a high temperature load condition.

Patent Document 1: Japanese Patent Laid-Open Publication No. 2008-226941
Patent Document 2: Japanese Patent Laid-Open Publication No. 2000-216042
Patent Document 3: Korean Patent Laid-Open Publication No. 10-2006-0135249

SUMMARY OF THE INVENTION

Therefore, an object of the present invention is to provide a method for manufacturing a laminated ceramic capacitor, and the laminated ceramic capacitor, which can solve the problems described above.

This invention is first directed to a method for manufacturing a laminated ceramic capacitor, which includes: a step of preparing a raw laminated body including a plurality of stacked dielectric ceramic layers containing a dielectric ceramic raw material powder, and internal electrodes formed along the specific interfaces between the dielectric ceramic layers; and a firing step of subjecting the raw laminated body to a heat treatment in order to carry out sintering of the raw laminated body, and characteristically has the following configuration in order to solve the technical problems described above.

More specifically, in this invention, a temperature profile in which the average rate of temperature rise is 40° C./second or more from room temperature to a maximum temperature is adopted in the firing step. Further, in order for the composition and properties of the dielectric ceramic raw material powder to be suitable for this high-rate temperature rise, the following composition is adopted.

The dielectric ceramic raw material powder contains $ABO_3$ (A necessarily contains Ba, and may further contain at least one of Ca and Sr; and B necessarily contains Ti, and may further contain at least one of Zr and Hf) as its main constituent, and contains R (R is at least one selected from Sc, Y, La, Ce, Pr, Nd, Pm, Sm, Eu, Gd, Tb, Dy, Ho, Er, Tm, Yb, and Lu), M (M is at least one selected from Mn, Cr, Co, and Fe), and Mg as accessory constituents. Furthermore, when the total amount of the accessory constituents contained is denoted by D parts by mol with respect to 100 parts by mol of the main constituent, whereas the specific surface area of the ceramic raw material powder for providing the main constituent is denoted by E m²/g, D/E is 0.2 to 0.8.

In the method for manufacturing a laminated ceramic capacitor according to this invention, the firing step is preferably carried out in accordance with a temperature profile in which the average rate of temperature rise is 100° C./second or more from room temperature to the maximum temperature.

This invention is also directed to a laminated ceramic capacitor including: a laminated body configured by a plurality of dielectric ceramic layers stacked, and a plurality of internal electrodes formed along the specific interfaces between the dielectric ceramic layers; and a plurality of external electrodes formed in different positions from each other on the outer surface of the laminated body and electrically connected to specific one of the internal electrodes.

In the laminated ceramic capacitor according to this invention, a dielectric ceramic constituting the dielectric ceramic layers contains $ABO_3$ (A necessarily contains Ba, and may further contain at least one of Ca and Sr; and B necessarily contains Ti, and may further contain at least one of Zr and Hf) as its main constituent, and contains R (R is at least one selected from Sc, Y, La, Ce, Pr, Nd, Pm, Sm, Eu, Gd, Tb, Dy, Ho, Er, Tm, Yb, and Lu), M (M is at least one selected from Mn, Cr, Co, and Fe), and Mg as accessory constituents, and the dielectric ceramic constituting the dielectric ceramic layers has an average grain size of 100 nm or less.

In the laminated ceramic capacitor according to this invention, the dielectric ceramic constituting the dielectric ceramic layers has an average grain size of 50 nm or less.

In the method for manufacturing a laminated ceramic capacitor according to this invention, the dielectric ceramic layers contain the accessory elements which have the action of inhibiting the ceramic grain growth, and sintering is completed in a short period of time in the firing step. Thus, the segregation of the accessory elements is prevented from being caused as much as possible in the dielectric ceramic layers, and can be made present homogeneously. Therefore, the grain growth during the firing is made less likely to be developed, and the ceramic constituting the obtained dielectric ceramic layers can be composed of microscopic grains.

Thus, in the laminated ceramic capacitor, even when the dielectric ceramic layers are reduced in layer thickness, lifetime characteristics can be made favorable in a high temperature loading test. In addition, the properties can be stabilized which are provided by the dielectric ceramic layers. Furthermore, even when the additive amount of the accessory elements is relatively small, the effect of the accessory elements can be produced sufficiently.

In addition, according to this invention, in the internal electrodes, changes in state such as electrode disconnection and ball formation are prevented during the heat treatment in the firing step, and the internal electrodes can be thus progressively reduced in layer thickness while maintaining the coverage of the internal electrodes at a high level, thereby making a contribution to the reduction in size of and the increase in capacitance of the laminated ceramic capacitor.

In addition, the reduced layer thickness and increased coverage for the internal electrodes are produced as a result of preventing the internal electrodes from being shrunk, and voids, gaps, and the like at the ends of the internal electrodes can be thus also prevented from being caused at the same time. Therefore, the sealing property of the laminated body is improved after the heat treatment, and the reliability of environment resistance can be also improved as a laminated ceramic electronic component.

In addition, the shrinkage of the internal electrodes is prevented as described above, and thus, in the case of extracting the internal electrodes to a predetermined surface of the laminated body, the degree of recess will be quite low at the extracted ends of the internal electrodes. In addition, sintering is completed in a short period of time in the firing step, and thus, almost no movement or segregation of the glass phase onto the surface will be caused due to the additive component to the ceramic constituting the dielectric ceramic layers. Therefore, the step for exposing the extracted ends of the internal electrodes can be skipped in the formation of external electrodes electrically connected to the internal electrodes.

In addition, even when the dielectric ceramic constituting the dielectric ceramic layers contains volatile components (sintering aids) such as Li, B, and Pb, the volatile components is prevented from being scattered by the heat treatment in the firing step, because sintering is completed in a short period of time in the firing step. As a result, the residual volume of the volatile components can be prevented from varying depending on changes in the size of the laminated body and the amount of charging a firing furnace.

In addition, in the case of the laminated ceramic capacitor including internal electrodes containing, as a conductive component, a base metal such as Ni, there is conventionally a need in the heat treatment step to precisely control the oxygen partial pressure in the atmosphere to near the equilibrium oxygen partial pressure of the base metal in order to achieve a balance between the prevention of the internal electrodes from being oxidized and the prevention of the ceramic from being reduced, and this need complicates the design of a firing furnace. In contrast, according to this invention, the high rate of temperature rise in the firing step can reduce the time for the heat treatment (ceramic sintering shrinkage), and thus, even in a more oxidizing atmosphere than the equilibrium oxygen partial pressure of the base metal, the heat treatment can be carried out almost without oxidation. Therefore, a laminated ceramic capacitor with high reliability can be manufactured which has the dielectric ceramic less likely to be reduced and requires no reoxidation treatment.

BRIEF EXPLANATION OF THE DRAWINGS

FIGS. 2(A) and 2(B) show mapping analysis images of an Mn element by a wavelength-dispersive X-ray microanalyzer (WDX); wherein FIG. 2(A) is sample 10 and FIG. 2(B) is sample 11 from Table 1, which were obtained in order to assess dispersion states of accessory constituents in dielectric ceramics constituting dielectric ceramic layers included in a laminated ceramic capacitor prepared in an experimental example.

DETAILED DESCRIPTION OF THE INVENTION

Figure 1:
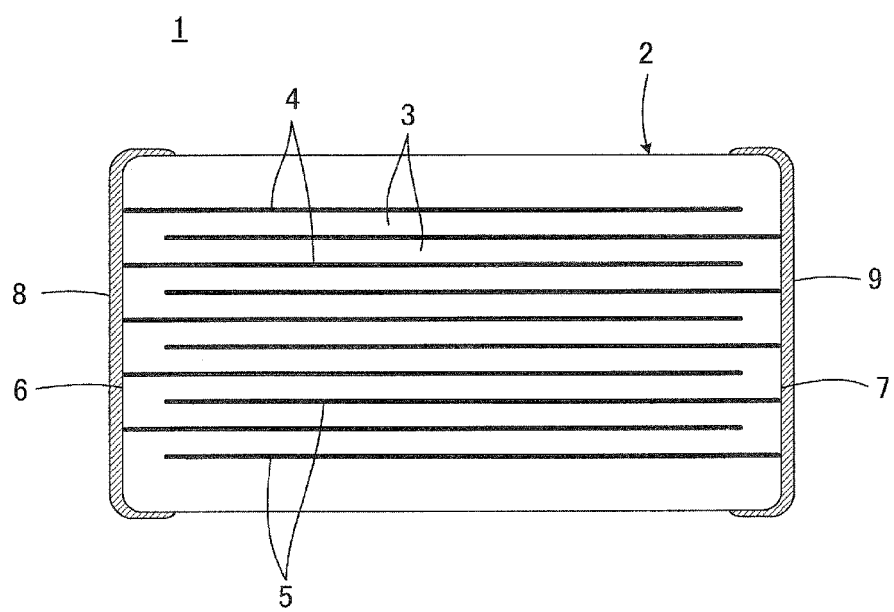
FIG. 1 is a cross-sectional view schematically illustrating a laminated ceramic capacitor produced by a manufacturing method according to an embodiment of this invention.

With reference to FIG. 1, the structure of a laminated ceramic capacitor 1 will be described to which this invention is applied.

The laminated ceramic capacitor 1 includes a laminated body 2 as a component main body. The laminated body 2 includes a plurality of dielectric ceramic layers 3 stacked, and a plurality of internal electrodes 4 and 5 formed along the specific interfaces between the dielectric ceramic layers 3. One and the other end surfaces 6 and 7 of the laminated body 2 respectively have exposed ends of the plurality of internal electrodes 4 and 5, and external electrodes 8 and 9 are formed respectively so as to electrically connect the respective ends of the internal electrodes 4 to each other and the respective ends of the internal electrodes 5 to each other.

For the manufacture of this laminated ceramic capacitor 1, the laminated body 2 in a raw state is first prepared by a well known method such as stacking ceramic green sheets with the internal electrodes 4 and 5 printed thereon. Then, a firing step is carried out for sintering of the raw laminated body. Then, the external electrodes 8 and 9 are formed respectively on the end surfaces 6 and 7 of the sintered laminated body 2 to complete the laminated ceramic capacitor 1.

In this invention, a powder which has the following composition and properties is used as a dielectric ceramic raw material powder, which is included in the ceramic green sheets to serve as the dielectric ceramic layers 3 included in the laminated body 2 described above.

More specifically, the dielectric ceramic raw material powder contains $ABO_3$ (A necessarily contains Ba, and may further contain at least one of Ca and Sr; and B necessarily contains Ti, and may further contain at least one of Zr and Hf) as its main constituent, and contains R (R is at least one selected from Sc, Y, La, Ce, Pr, Nd, Pm, Sm, Eu, Gd, Tb, Dy, Ho, Er, Tm, Yb, and Lu) and M (M is at least one selected from Mn, Cr, Co, and Fe) as accessory constituents. Furthermore, in this dielectric ceramic raw material powder, when the total amount of the accessory constituents contained is denoted by D parts by mol with respect to 100 parts by mol of the main constituent, whereas the specific surface area of the ceramic raw material powder for providing the main constituent is denoted by E $m^2/g$, D/E is 0.2 to 0.8.

In addition, in the firing step described above, a heat treatment step of applying a temperature profile in which the average rate of temperature rise is 40° C./second or more from room temperature to the maximum temperature is carried out according to this invention. Preferably, the temperature profile is adjusted to 100° C./second or more.

The raw laminated body is preferably subjected to a degreasing treatment before the heat treatment step.

In addition, after reaching the maximum temperature, cooling is preferably carried out immediately without keeping the temperature in the heat treatment step.

When the laminated ceramic capacitor 1 is manufactured by applying the high rate of temperature rise as described above while using the dielectric ceramic raw material powder, which has the composition and properties as described previously, the dielectric ceramic constituting the dielectric ceramic layers 3 can have, as microscopic grains, an average grain size of 100 nm or less, preferably 50 nm or less.

It is to be noted that while the laminated ceramic capacitor 1 shown is a two-terminal type laminated ceramic capacitor including the two external electrodes 8 and 9, this invention can be also applied to multi-terminal type laminated ceramic electronic components.

An experimental example will be described below which was carried out for confirming the effects of this invention.

(A) Preparation of Ceramic Powder for Main Constituent

First, a barium titanate powder and a barium calcium titanate powder were prepared. Predetermined amounts of $BaCO_3$ powder and $TiO_2$ powder for the barium titanate powder, and predetermined amounts of $BaCO_3$ powder, $CaCO_3$ powder, and $TiO_2$ powder for the barium calcium titanate powder were each weighed, then mixed in a ball mill for 42 hours, and subjected to a heat treatment for a solid-phase reaction to obtain a $BaTiO_3$ (hereinafter, "BT") powder and a $(Ba_{0.90}Ca_{0.10})TiO_3$ (hereinafter, "BCT") powder.

In this case, each of the BT powder and the BCT powder was prepared so as to have target grain size and specific surface area (SSA) as shown in Table 1. It is to be noted that the grain size refers to an average grain size in the case of converting a SEM observation image to a spherical shape, whereas the SSA was measured by an apparatus (Multisorb) using a nitrogen adsorption method.

(B) Preparation of Dielectric Ceramic Raw Material Powder

In order to obtain samples 1 to 17 shown in Table 1, respective powders of MgO, MnO, $Dy_2O_3$, and $SiO_2$ were blended as follows with each of the BT powder and BCT powder obtained in the way described above.

Samples 1, 2, and 7 to 9: 100BT (or BCT)-1.0Dy-1.0Mg-0.3Mn-1.0Si

Samples 3 to 6: 100BT (or BCT)-10Dy-10Mg-3Mn-1.0Si

Samples 10 to 13, 16, and 17: 100BT (or BCT)-2.5Dy-2.5Mg-0.8Mn-1.0Si

Sample 14: 100BT-3.0Dy-1.1Mg-0.8Mn-1.1Si

Sample 15: 100BT-7.4Dy-2.7Mg-2.0Mn-1.1Si.

Next, these blended materials were mixed in a ball mill for 5 hours. Then, drying and dry grinding were carried out to obtain a dielectric ceramic raw material powder.

(C) Production of Laminated Ceramic Capacitor

The dielectric ceramic raw material powder obtained with the addition of a polyvinyl butyral based binder and ethanol was subjected to wet mixing in a ball mill for 5 hours to prepare a ceramic slurry.

Next, this ceramic slurry was formed by a die coater into the shape of a sheet to obtain ceramic green sheets.

Next, a conductive paste containing Ni as its main constituent was applied by screen printing onto the ceramic green sheets, thereby forming conductive paste films to serve as internal electrodes.

In addition, as a measure for eliminating differences in level on the principal surfaces of the ceramic green sheets, which can be produced between the regions with the conductive paste films and the regions without the conductive paste films, a dielectric paste film of the same composition as the ceramic slurry was formed on the regions without the conductive paste films so as to have a thickness equivalent to that of the conductive paste film.

Next, the ceramic green sheets with the conductive paste films and dielectric paste films formed were stacked alternately so that the sides were alternated to which the conductive paste films were extracted, thereby providing a raw laminated body including 5 effective layers.

Next, the raw laminated body was heated to a temperature of 300° C. in an $N_2$ atmosphere to burn the binder, and then the binder was burned again at a temperature of 700° C. in an $N_2$ atmosphere.

Then, in accordance with a conventional firing method, a heat treatment of increasing the temperature at a rate of temperature rise in Table 1 was carried out in a reducing atmosphere composed of a $H_2$—$N_2$—$H_2O$ gas with an oxygen partial pressure $10^{-10}$ MPa to obtain a sintered laminated body. In this case, the conditions of the maximum temperature in the firing step and of the time for keeping at the maximum temperature were set up as follows, depending on the rate of temperature rise.

The case of 50° C./min for Rate of Temperature Rise: keeping at a maximum temperature of 1200° C. for 5 minutes.

The case of 40 to 200° C./min for Rate of Temperature Rise: maximum temperature of 1400° C. without keeping.

Next, a Cu paste containing a $B_2O_3$—$Li_2O$—$SiO_2$—BaO glass frit was applied to both end surfaces of the sintered laminated body, and fired at a temperature of 800° C. in an $N_2$ atmosphere to form external electrodes electrically connected to the internal electrodes, thereby providing laminated ceramic capacitors as samples.

The laminated ceramic capacitors thus obtained had outside dimensions of 0.5 mm in width and 1.0 mm in length, and the area of the electrode opposed per dielectric ceramic layer was 0.3 mm². In addition, the dielectric ceramic layers were 0.3 μm in thickness, and the internal electrodes were 0.3 μm in thickness.

(D) Evaluation

As shown in Table 1, evaluated were the grain size, the degree of grain growth, and the number of defectives in a high temperature load life test.

The measurement of the grain size was made in such a way that the laminated ceramic capacitors according to each sample were fractured and subjected to thermal etching at a temperature of 1000° C., and the fractured surfaces were observed by using a scanning microscope. More specifically, the observation images were subjected to an image analysis to determine the equivalent circle diameters as the grain sizes. The average value was calculated for the number of grains measured of 300, as the "Grain Size" shown in Table 1.

The degree of grain growth was calculated from the formula of "Degree of Grain Growth"="Average Grain Size after Firing"/"Grain Size of Ceramic Powder for Main Constituent".

In order to find the number of defects in a high temperature load life test, the high temperature load life test was carried out in which DC 4V was applied to the dielectric ceramic layers of 0.3 μm in thickness at a temperature of 85° C. to measure the change in insulation resistance with time for the laminated ceramic capacitors according to each sample. In this case, 100 samples for each sample number were subjected to the high temperature load life test, and the sample was determined as a defective if the insulation resistance value was decreased to 100 kΩ or less before a lapse of 2000 hours.

for samples 2, 9, and 14 with D/E less than 0.2. Further, when the grain size is increased as described above, the number of defectives is also large in the high temperature load life test.

In contrast to these samples, in the case of samples 4, 6, 11, 13, and 15 to 17 with 40° C./second or more for the rate of temperature rise and D/E of 0.2 to 0.8, the grain size is reduced to 100 nm or less, and the number of defectives is even 0 in the high temperature load life test. In particular, among these samples 4, 6, 11, 13, and 15 to 17, the grain size is further reduced to 50 nm or less in the case of samples 4, 6, 11, 13, 15, and 17 with 100° C./second or more for the rate of temperature rise.

Furthermore, for example, when a comparison is made among samples 11, 16, and 17, the samples are different only in rate of temperature rise: the rate of temperature rise of 200° C./second or more in the case of sample 11; the rate of temperature rise of 40° C./second or more in the case of sample 16; and the rate of temperature rise of 100° C./second or more in the case of sample 17. As a result, the grain size is further reduced as 55 nm, 50 nm, and 45 nm, in the order of increasing the rate of temperature rise: samples 16, 17, and 11.

It is to be noted that although Table 1 shows no sample with D/E greater than 0.8, it has been confirmed that the D/E greater than 0.8 causes the segregation of the accessory constituent to degrade the lifetime characteristics in the high temperature load life test, even if firing is carried out with high-rate temperature rise such as 40° C./second or more, and further, 100° C./second for the rate of temperature rise in the firing step.

Figure 2A:
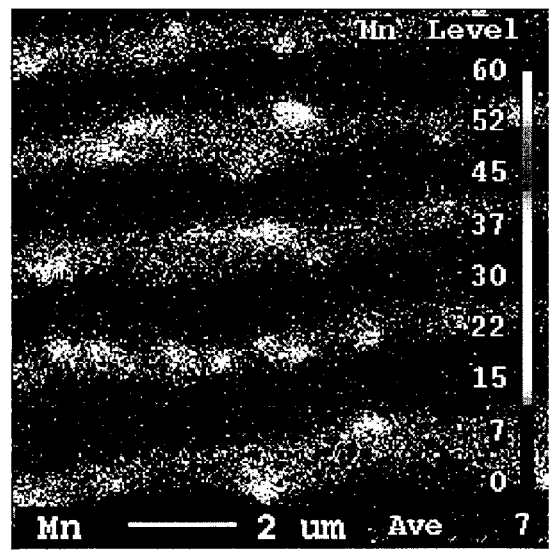
Figure 2B:
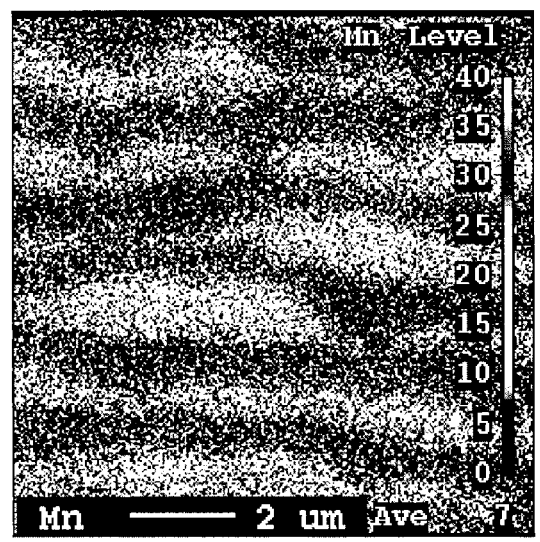

FIGS. 2(A) and 2(B) show mapping analysis images of an Mn element by a wavelength-dispersive X-ray microanalyzer (WDX), which were obtained in order to assess dispersion states of accessory constituents in dielectric ceramics consti-

TABLE 1

| Sample Number | Type of Main Constituent | Grain Size for Main Constituent Powder (nm) | SSA of Main Constituent Powder: E (m²/g) | Total Amount of Accessory Constituent: D (parts by mol) | D/E | Rate of Temperature Rise | Grain Size (nm) | The Degree of Grain Growth | Number of Defectives in High Temperature Load Life Test |
|---|---|---|---|---|---|---|---|---|---|
| 1 | BT | 12 | 80 | 2.3 | 0.03 | 50° C./min | 273 | 22.8 | 100 |
| 2 | BT | 12 | 80 | 2.3 | 0.03 | 200° C./second | 197 | 16.4 | 100 |
| 3 | BT | 12 | 80 | 23 | 0.29 | 50° C./min | 260 | 21.7 | 100 |
| 4 | BT | 12 | 80 | 23 | 0.29 | 200° C./second | 21 | 1.8 | 0 |
| 5 | BCT | 14 | 72 | 23 | 0.32 | 50° C./min | 245 | 17.5 | 100 |
| 6 | BCT | 14 | 72 | 23 | 0.32 | 200° C./second | 22 | 1.6 | 0 |
| 7 | BT | 42 | 24 | 2.3 | 0.10 | 50° C./min | 220 | 5.2 | 95 |
| 8 | BT | 40 | 25 | 2.3 | 0.09 | 50° C./min | 247 | 6.2 | 100 |
| 9 | BT | 40 | 25 | 2.3 | 0.09 | 200° C./second | 153 | 3.8 | 50 |
| 10 | BT | 40 | 25 | 5.8 | 0.23 | 50° C./min | 215 | 5.4 | 92 |
| 11 | BT | 40 | 25 | 5.8 | 0.23 | 200° C./second | 45 | 1.1 | 0 |
| 12 | BCT | 43 | 23 | 5.8 | 0.25 | 50° C./min | 238 | 5.5 | 99 |
| 13 | BCT | 43 | 23 | 5.8 | 0.25 | 200° C./second | 49 | 1.1 | 0 |
| 14 | BT | 40 | 25 | 4.9 | 0.19 | 200° C./second | 101 | 2.5 | 5 |
| 15 | BT | 40 | 25 | 12.1 | 0.49 | 200° C./second | 43 | 1.1 | 0 |
| 16 | BT | 40 | 25 | 5.8 | 0.23 | 40° C./second | 55 | 1.4 | 0 |
| 17 | BT | 40 | 25 | 5.8 | 0.23 | 100° C./second | 50 | 1.3 | 0 |

The following is determined from Table 1.

In the case of samples 1, 3, 5, 7, 8, 10, and 12 with 50° C./min for the rate of temperature rise, the grain size is much greater than 200 nm due to grain growth. Further, when the grain size is increased as described above, the number of defectives is also large in the high temperature load life test.

On the other hand, among samples 2, 4, 6, 9, 11, and 13 to 17 with 40° C./second or more for the rate of temperature rise, the grain size is also greater than 100 nm due to grain growth tuting dielectric ceramic layers included in a laminated ceramic capacitor prepared in this experimental example. FIG. 2(A) is an image for sample 10, and FIG. 2(B) is an image for sample 11.

It is to be noted that although FIGS. 2(A) and 2(B) are not intended to indicate the mapping analysis of the Mn element accurately because FIGS. 2(A) and 2(B) are not presented in full color, it can be determined in the black and white representation that the segregation of the Mn element is caused more strongly when the contrast is greater.

Sample 10 and sample 11 are different from each other in the firing conditions of the rate of temperature rise, maximum temperature, and keeping time. In the case of sample 11 with the high rate of temperature rise of 200° C./second adopted, as shown in FIG. 2(B), there is less segregation of the Mn element as the accessory constituent, and the Mn element is dispersed almost homogeneously. It is considered that this homogeneous dispersion enhances the effect of inhibiting the grain growth. In contrast, in the case of sample 10 with the low rate of temperature rise of 50° C./second adopted, the segregation of the Mn element is caused strongly as shown in FIG. 2(A).

It is to be noted that while Dy and Mn were used respectively as the accessory constituent elements R and M in the dielectric ceramic raw material powder in the experimental example, it has been confirmed that a similar effect is produced even in the case of using any of Sc, Y, La, Ce, Pr, Nd, Pm, Sm, Eu, Gd, Tb, Ho, Er, Tm, Yb, and Lu except for Dy as the accessory constituent element R, or in the case of using any of Cr, Co, and Fe except for Mn as the accessory constituent element M.

DESCRIPTION OF REFERENCE SYMBOLS

| | |
|---|---|
| 1 | laminated ceramic capacitor |
| 2 | laminated body |
| 3 | dielectric ceramic layer |
| 4, 5 | internal electrode |

The invention claimed is:

1. A method for manufacturing a laminated ceramic capacitor, the method comprising:

preparing a raw laminated body including a plurality of stacked dielectric ceramic layers containing a dielectric ceramic raw material powder, and internal electrodes along specific interfaces between the dielectric ceramic layers; and subjecting the raw laminated body to a heat treatment in accordance with a temperature profile in which an average rate of temperature rise is 40° C./second or more from room temperature to a maximum temperature so as to sinter the raw laminated body, wherein the dielectric ceramic raw material powder contains $ABO_3$ as a main constituent thereof, and contains R, M, and Mg as accessory constituents thereof, A contains Ba, B contains Ti, R is at least one element selected from Sc, Y, La, Ce, Pr, Nd, Pm, Sm, Eu, Gd, Tb, Dy, Ho, Er, Tm, Yb, and Lu, and M is at least one element selected from Mn, Cr, Co, and Fe, and when a total amount of the accessory constituents is denoted by D parts by mol with respect to 100 parts by mol of the main constituent, and a specific surface area of the main constituent is denoted by E $m^2/g$, then D/E is 0.2 to 0.8.

2. The method for manufacturing a laminated ceramic capacitor according to claim 1, wherein A further contains at least one of Ca and Sr.

3. The method for manufacturing a laminated ceramic capacitor according to claim 2, wherein B further contains at least one of Zr and Hf.

4. The method for manufacturing a laminated ceramic capacitor according to claim 1, wherein B further contains at least one of Zr and Hf.

5. The method for manufacturing a laminated ceramic capacitor according to claim 1, wherein the heat treatment is carried out in accordance with a temperature profile in which the average rate of temperature rise is 100° C./second or more from room temperature to a maximum temperature.

* * * * *